W. D. HARRIS.
TIRE.
APPLICATION FILED OCT. 2, 1907.
940,528.
Patented Nov. 16, 1909.
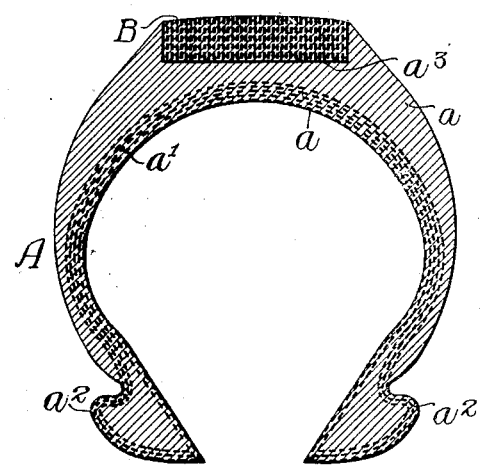

UNITED STATES PATENT OFFICE.

WILLIAM D. HARRIS, OF PHILADELPHIA, PENNSYLVANIA, ASSIGNOR TO HARRIS TIRE & RUBBER CO., OF PHILADELPHIA, PENNSYLVANIA, A CORPORATION OF MAINE.

TIRE.

940,528.      Specification of Letters Patent.      Patented Nov. 16, 1909.

Application filed October 2, 1907. Serial No. 395,510.

*To all whom it may concern:*

Be it known that I, WILLIAM D. HARRIS, a citizen of the United States, residing in Philadelphia, Pennsylvania, have invented certain Improvements in Tires, of which the following is a specification.

One object of my invention is to provide a tire having a tread portion formed of a number of strips of fabric so disposed as to lie in a plane substantially perpendicular to the tread surface and so fastened in place that they shall be permanently held in their proper position in order to prevent punctures, stone-cutting, or other injuries to the tire.

I further desire to provide novel means for holding in a tire the body of fabric constituting the tread surface in order that this shall not be easily displaced, loosened, split or otherwise injured.

These objects and other advantageous ends I secure as hereinafter set forth, reference being had to the accompanying drawing, in which the figure is a vertical section of a tire constructed according to my invention.

In the above drawings A represents a vehicle tire of the ordinary shape which consists of a body $a$ of rubber or other equivalent material having a lining $a'$ composed of a number of layers of fabric such as canvas or cotton duck, placed one over the other, these layers being arranged at their ends as indicated at $a^2$ to form clencher projections.

The wearing or tread surface of the tire consists of a body B of fabric strips arranged substantially parallel to each other with their edges perpendicular to the tread surface of the tire. Said strips may be composed of any suitable material and are held together in a solid mass by friction rubber, the whole mass being so combined with the rubber that it forms a uniform, uninterrupted wearing surface extending around the tire. In order that this mass of fabric strips may be prevented from spreading and be properly maintained in place in the tire, I place a layer of canvas or tire fabric $a^3$ in a recess of the tire and on this I place said mass of strips, turning up the edges of said canvas so that they are parallel with said strips.

I claim—

A hollow tire having a rubber body portion provided with an annular recess in its wearing face, a piece of canvas extending longitudinally around the tire in the recess and having its edges turned up along the sides thereof so as to line said recess, with a body of fabric strips set in the recess upon said lining of canvas between said turned up edges, and said strips extending circumferentially of the tire and being arranged to lie in planes substantially perpendicular to the tread surface thereof.

In testimony whereof, I have signed my name to this specification, in the presence of two subscribing witnesses.

WILLIAM D. HARRIS.

Witnesses:
   R. L. STEVENS,
   JOS. H. KLEIN.